3,391,156
1-ALIPHATIC-2-NITROIMIDAZOLES
Alden Gamaliel Beaman, North Caldwell, N.J., Robert Duschinsky, Gif-sur-Yvette, France, and William Paul Tautz, New York, N.Y., assignors to Hoffmann-La Roche Inc., Nutley, N.J., a corporation of New Jersey
No Drawing. Continuation-in-part of application Ser. No. 447,068, Apr. 9, 1965. This application Mar. 14, 1967, Ser. No. 622,882
5 Claims. (Cl. 260—309)

ABSTRACT OF THE DISCLOSURE

Novel antimicrobial 1-aliphatic-2-nitroimidazoles are prepared by treating 2-nitroimidazole with an aliphatic halide.

This application is a continuation-in-part of application Ser. No. 447,068, filed Apr. 9, 1965, now abandoned.

BRIEF SUMMARY OF THE INVENTION

The present invention relates to antimicrobial 1-aliphatic-2-nitroimidazoles and, more particularly, relates to 1-R-2-nitroimidazole wherein R is a straight or branched chain aliphatic hydrocarbon containing 2–6 carbon atoms or cycloalkyl of 3–6 carbon atoms and pharmaceutically acceptable acid addition salts thereof.

DETAILED DESCRIPTION

The 1-aliphatic-2-nitroimidazoles comprehended by this invention include the 1-lower alkyl-2-nitroimidazoles such as:

1-ethyl-2-nitroimidazole
1-n-propyl-2-nitroimidazole
1-i-propyl-2-nitroimidazole
1-n-butyl-2-nitroimidazole
1-sec.-butyl-2-nitroimidazole
1-t-butyl-2-nitroimidazole
1-pentyl-2-nitroimidazole
1-hexyl-2-nitroimidazole, and the like;

1-lower alkenyl-2-nitroimidazoles such as:

1-vinyl-2-nitroimidazole
1-allyl-2-nitroimidazole
1-propenyl-2-nitroimidazole
2-butenyl-2-nitroimidazole, and the like;

1-lower alkynyl-2-nitroimidazoles such as:

1-thinyl-2-nitroimidazole
1-(propynyl)-2-nitroimidazole
1-(2-propynyl)-2-nitroimidazole
1-(2-butynyl)-2-nitroimidazole, and the like;

and 1-cyclo-lower alkyl-2-nitroimidazoles such as:

1-cyclopropyl-2-nitroimidazole
1-cyclobtuyl-2-nitroimidazole
1-cyclopentyl-2-nitroimidazole
1-cyclohexyl-2-nitroimidazole and their acid addition salts with pharmaceutically acceptable acids.

The novel end products of this invention, i.e., the 1-R-2-nitroimidazoles, are prepared by reacting 2-nitroimidazole with the appropriate alkylating agent or aliphatic halide such as, for example, diethylsulfate, n-propyliodide, allyl bromide, and the like. The reaction is suitably carried out at an elevated temperature, preferably at a temperature between about 50° to about 190° C. The reaction is preferably carried out in the presence of an inert organic solvent such as dimethylformamide, dimethylsulfoxide, hydrocarbon solvents such as toluene, xylene, and the like, and preferably the reaction is carried out utilizing the sodium salt of 2-nitroimidazole as the starting material.

Acid addition salts of the 1-aliphatic-2-nitroimidazoles of this invention are prepared by reacting with any of the ordinary inorganic acids such as hydrochloric acid, hydrobromic acid, sulfuric acid, and the like, or with organic acids such as oxalic acid, acetic acid, lactic acid, tartaric acid, and the like. Non-pharmaceutically acceptable acid addition salts can be converted into pharmaceutically acceptable acid addition salts by neutralization followed by reaction with a suitable pharmaceutically acceptable acid.

The novel 1-aliphatic-2-nitroimidazoles of this invention and their pharmaceutically acceptable acid addition salts are useful as antimicrobial agents against a variety of bacteria, fungi, pathogenic yeasts and protozoa. They are, for example, particularly active against *Trichomonas vaginalis* and *Trichomonas foetus* and against *Endamoeba histolytica*. Certain compounds of this series, e.g., the 1-ethyl-2-nitroimidazole, have been found to be particularly distinguishable by their superior activity against *Trichomonas vaginalis* and *Endamoeba histolytica*. The novel compounds of this invention are, therefore, useful as germicides, antiprotozoal agents and as agents for the treatment of pathogenic yeast infections. They can be administered orally, parenterally, topically or in suppository form. Typical oral dosages range from about 20 to about 200 mg./kg. animal body weight with dosage adjusted to species and individual requirements. The compounds of this invention can be formulated into the useful pharmaceutical dosage forms in combination with organic or inorganic inert carrier materals suitable for enteral, parenteral or topical application such as, for example, water, gelatin, lactose, starch, magnesium stearate, vegetable oil, gum arabic, polyalkylene glycols, Vaseline, etc., or other conventional excipients. They can also contain other additives such as preserving, stabilizing, wetting or emulsifying agents, and the like, or they can be formulated with other therapeutically useful materials.

The novel products of this invention and their use will be more fully understood from the examples which follow. These examples are intended to merely illustrate the invention and are not to construed as limitative thereof.

Example 1.—Preparation of 1-ethyl-2-nitroimidazole

Powdered sublimed 2-nitroimidazole (10.0 g., 88.4 m.moles) was dissolved in 100 ml. of 1 N NaOH solution. The solution (pH 11.6) was warmed to 48° and 17.5 ml. (20.5 g., 133 m.moles) of diethyl sulfate was added with stirring. The stirred solution was maintained at 46–60°, and as the pH fell below 8, additional 1 N NaOH solution was added to bring the pH to 10. After 20 minutes an additional 10 ml. (11.7 g., 76 m.moles) of diethyl sulfate was added. The mixture was stirred at 46–60° (pH 8 to 10) for 1¼ hours and a total of 93.5 ml. of additional 1 N NaOH was added as described. The mixture was cooled to room temperature and decanted from 2 to 3 ml. of oil, which was discarded. The aqueous decantate was extracted with four 350 ml. portions of ethylacetate which were combined, dried over anhydrous $MgSO_4$, filtered and evaporated in vacuo to an oil which partly crystallized on cooling (weight=12.1 g.).

This was dissolved in 120 ml. of $CCl_4$ at room temperature, the solution treated with charcoal and the filtrate cooled in the freezer to give pale yellowish flakelets of 1-ethyl-2-nitroimidazole, melting point 43.5–44.5°.

Example 2.—Preparation of 1-n-propyl-2-nitroimidazole

A solution of 7.0 g. of sublimed 2-nitroimidazole in 100 ml. of dimethylformamide plus 13.3 ml. of 4.65 N sodium methoxide in methanol was boiled until the temperature reached 152°, cooled to 85° and 9.0 ml. (16 g.) of n-propyliodide was added. The mixture was heated at about 100° for 30 minutes. The dimethylformamide was removed in vacuo and the residue was shaken in a separatory funnel with a mixture of 200 ml. of chloroform and 20 ml. of water. Aqueous $NaHSO_3$ solution was added and the mixture was shaken until the red color was removed from the chloroform. The layers were separated and the chloroform layer was extracted in turn with 20 ml. portions of water, saturated aqueous sodium carbonate solution and water. The chloroform layer was dried and the solvent removed in vacuo. The residual oil was distilled in vacuo to give 1-n-propyl-2-nitroimidazole as a pale yellow liquid, B.P. 101–103° at 0.1 mm.

$$n_D^{25} = 1.5447$$

$$\lambda_{max.}^{iPrOH} = 312 \; m\mu, \; \epsilon = 8200$$

Example 3.—1-n-amyl-2-nitroimidazole

By analogy to Example 2 above using n-amyliodide there was prepared 1-n-amyl-2-nitroimidazole, B.P. 113–115° at 0.1 mm. $n_D^{25} = 1.5269$, $$\lambda_{max.}^{iPrOH} = 313 \; m\mu, \; \epsilon = 8200$$

Example 4.—1-n-butyl-2-nitroimidazole

By analogy to Example 2 above using n-butyliodide there was prepared 1-n-butyl-2-nitroimidazole, B.P. 115–116° at 0.1 mm. $n_D^{27} = 1.5336$, $$\lambda_{max.}^{EtOH} = 314 \; m\mu, \; \epsilon = 8100$$

Example 5.—1-allyl-2-nitroimidazole

By analogy to Example 2 above using allyl bromide there was prepared 1-allyl-2-nitroimidazole, B.P. 105° at 0.1 mm. $n_D^{28} = 1.555$, $$\lambda_{max.}^{EtOH} = 310 \; m\mu, \; \epsilon = 6900$$

Example 6.—Preparation of 1-isopropyl-2-nitroimidazole

A solution of 10.0 g. of sublimed 2-nitroimidazole in 100 ml. of dimethylformamide plus 19.6 ml. of 4.56 N sodium methoxide in methanol was boiled until the temperature reached 152°, cooled to 95° and 11.5 ml. (19.5 g.) of isopropyl iodide was added and the mixture was heated at 125–130° for 10 minutes. An additional 11.5 ml. of isopropyl iodide was added and the mixture was heated at 125° for 15 minutes. The dimethylformamide was removed in vacuo and the residue was shaken in a separatory funnel with a mixture of 250 ml. of chloroform and 25 ml. of water. Aqueous $NaHSO_3$ solution was added and the mixture shaken until the red color was removed from the chloroform. The layers were separated and the chloroform layer was extracted in turn with 25 ml. portions of water, saturated aqueous sodium carbonate solution and water. The chloroform layer was dried and allowed to evaporate slowly to give a crystalline solid. This was crystallized twice from boiling carbontetrachloride to give 1-isopropyl-2-nitroimidazole as colorless crystals, M.P. 88–89.5°.

$$\lambda_{max.}^{iPrOH} = 313 \; m\mu, \; \epsilon = 7500$$

Example 7.—1-isobutyl-2-nitroimidazole 1-isobutyl-2-nitroimidazole was prepared by analogy to Example 6 using isobutyl iodide. After purification the crystalline material melted at 53°, $$\lambda_{max.}^{iPrOH} = 314 \; m\mu, \; \epsilon = 6200$$

Example 8

Typical pharmaceutical formulations are given below:

Tablet formulation

| | Per tablet, mg. |
|---|---|
| 1-ethyl-2-nitroimidazole | 50.0 |
| Lactose | 118.5 |
| Corn starch | 70.5 |
| Pregelatinized corn starch | 8.0 |
| Calcium stearate | 3.0 |
| Total weight | 250.0 |

Procedure (1) 1-ethyl-2-nitroimidazole, lactose, corn starch and pregelatinized corn starch were mixed in a suitable size mixer.

(2) The mix was passed through a Fitzpatrick Comminuting Machine fitted with No. 1A screen and with knives forward.

(3) The mix was then returned to the mixer and moistened with water to a thick paste. The moist mass was passed through a No. 12 screen and the moist granules were dried on paper lined trays at 110° F.

(4) The dried granules were returned to the mixer, the calcium stearate was added and mixed well.

(5) The granules were compressed at a tablet weight of 250 mg., using standard concave punches having a diameter of 5/16″.

Capsule formulation

| | Per capsule mg. |
|---|---|
| 1-ethyl-2-nitroimidazole | 50 |
| Lactose | 118 |
| Corn starch | 37 |
| Talc | 5 |
| Total weight | 210 |

Procedure (1) 1-ethyl-2-nitroimidazole, lactose and corn starch were mixed in a suitable mixer.

(2) The mixture was further blended by passing through a Fitzpatrick Comminuting Machine with a No. 1A screen with knives forward.

(3) The blended powder was returned to the mixer, the talc added and blended thoroughly. The mixture was filled into No. 4 hard shell gelatin capsules on a capsulating machine.

*Parenteral formulation* (per cc.)

| | | |
|---|---|---|
| 1-ethyl-2-nitromidazole | mg | 5.1 |
| Propylene glycol | cc | 0.4 |
| Benzyl alcohol (benzaldehyde free) | cc | 0.015 |
| Ethanol (anhydrous) | cc | 0.10 |
| Sodium benzoate | mg | 48.8 |
| Benzoic acid | mg | 1.2 |
| Water for injection, q.s. | cc | 1.0 |

Procedure (for 10,000 cc.)

(1) The 51 gms. of 1-ethyl-2-nitroimidazole were dissolved in 150 cc of benzyl alcohol; 4,000 cc. of propylene glycol and 1,000, cc. of ethanol were added.

(2) The 12 gms. of benzoic acid were dissolved in the above. The 488 gms. of sodium benzoate dissolved in 3,000 cc. of water for injection were added. The solution was brought up to final volume of 10,000 cc. with water for injection.

(3) The solution was filtered through an 02 Selas candle, filled into suitable size ampules, gassed with $N_2$ and sealed. It was then autoclaved at 10 p.s.i. for 30 minutes.

Suppository formulation (per 1.3 gm. suppository)

| | Gm. |
|---|---|
| 1-ethyl-2-nitroimidazole | 0.050 |
| Refined cocoa butter-coconut derived | 1.205 |
| Carnauba wax | 0.045 |

Procedure (1) The cocoa butter and the carnauba wax were melted in a suitable size glass lined container, mixed well and cooled to 45° C.

(2) 1-Ethyl-2-nitroimidazole, which had been reduced to a fine powder with no lumps, was added and stirred until completely and uniformly dispersed.

(3) The mixture was poured into suppository molds to yield suppositories having an individual weight of 1.3 gms.

(4) The suppositories were removed from molds and cooled. They were individually wrapped in wax paper for packaging.

Topical cream (per 100 gms. cream)

| | Gm. |
|---|---|
| 1-ethyl-2-nitroimidazole | 5.1 |
| Stearic acid | 15.0 |
| Mineral oil light | 1.5 |
| Sorbitan monostearate | 2.5 |
| Methyl p-hydroxybenzoate | 0.08 |
| Propyl p-hydroxbenzoate | 0.02 |
| Sorbitol solution N.F. | 5.00 |
| Polyoxyethylene sorbitan monostearate | 1.69 |
| Distilled water | 72.5 |

Procedure (1) The stearic acid, mineral oil, sorbitan monostearate and methyl and propyl p-hydroxybenzoates were melted together at approximately 75° C. in a suitable size stainless steel, jacketed kettle with agitator.

(2) A suspension of 1-ethyl-2-nitroimidazole in a solution of polyoxyethylene sorbitan monostearate, sorbitol N.F. and distilled water was added to the melted mixture.

(3) The mixture was stirred at 75° C. until uniform and the temperature was gradually reduced with continuous stirring.

(4) When the temperature reached 48° C., the cream was transferred to storage containers.

(5) The cream was packaged in wax lined, tin tubes (opal glass jars may also be used).

We claim:

1. 1 - R - 2 - nitroimidazole wherein R is a straight or branched chain alkenyl group of 2 to 6 carbon atoms, a straight or branched chain alkynyl group of 2 to 6 carbon atoms or cycloalkyl of 3–6 carbon atoms and a pharmaceutically acceptable acid addition salt thereof.

2. A compound according to claim 1 wherein R is alkenyl of 2–6 carbon atoms.

3. The compound according to claim 2 wherein the alkenyl group is an allyl group, i.e., the compound 1-allyl-2-nitroimidazole.

4. A compound according to claim 1 where R is alkynyl of 2–6 carbon atoms.

5. A compound according to claim 1 wherein R is cycloalkyl of 3–6 carbon atoms.

References Cited

Gallo et al., Journ. Org. Chem., vol. 29, pp. 862–5 (April 1964).

Netherlands, printed application, 6,510,485, February 1966.

NORMA S. MILESTONE, *Primary Examiner.*

WALTER A. MODANCE, *Examiner.*

N. TROUSOF, *Assistant Examiner.*

UNITED STATES PATENT OFFICE
CERTIFICATE OF CORRECTION

Patent No. 3,391,156  July 2, 1968

Alden Gamaliel Beaman et al.

It is certified that error appears in the above identified patent and that said Letters Patent are hereby corrected as shown below:

Column 1, line 50, "1-thinyl-" should read -- 1-ethinyl- --; line 51, "1-(propynyl)-" should read -- 1-(1-propynyl)- --.

Signed and sealed this 10th day of March 1970.

SEAL)

Attest:

Edward M. Fletcher, Jr.
Attesting Officer

WILLIAM E. SCHUYLER, JR.
Commissioner of Patents